(12) United States Patent
Warren

(10) Patent No.: US 12,462,671 B2
(45) Date of Patent: Nov. 4, 2025

(54) APPARATUSES AND METHODS FOR MONITORING BATTERY SYSTEMS INCLUDING MESH NETWORKS

(71) Applicant: Dragonfly Energy Corp., Reno, NV (US)

(72) Inventor: Andrew Warren, Reno, NV (US)

(73) Assignee: Dragonfly Energy Corp., Reno, NV (US)

( * ) Notice: Subject to any disclaimer, the term of this patent is extended or adjusted under 35 U.S.C. 154(b) by 0 days.

(21) Appl. No.: 18/541,122

(22) Filed: Dec. 15, 2023

(65) Prior Publication Data

US 2024/0203241 A1    Jun. 20, 2024

Related U.S. Application Data

(60) Provisional application No. 63/433,355, filed on Dec. 16, 2022.

(51) Int. Cl.
*G08C 17/02* (2006.01)
*H02J 7/00* (2006.01)

(52) U.S. Cl.
CPC ............ *G08C 17/02* (2013.01); *H02J 7/0047* (2013.01)

(58) Field of Classification Search
CPC .... G08C 17/02; G01R 31/371; G01R 31/382; G01R 31/392; H02J 7/0047; H02J 7/00041; H02J 7/0048; H02J 7/005; H02J 13/00; H01M 10/4257; H01M 10/482; H01M 2010/4271; H01M 2010/4278; B60L 58/15; B60L 58/18

See application file for complete search history.

(56) References Cited

U.S. PATENT DOCUMENTS

| | | | |
|---|---|---|---|
| 2011/0164512 A1 | 7/2011 | Citrano, III et al. | |
| 2013/0271072 A1* | 10/2013 | Lee | H01M 10/4207 320/108 |
| 2014/0347014 A1 | 11/2014 | Lee et al. | |

(Continued)

OTHER PUBLICATIONS

International Search Report and Written Opinion mailed Mar. 25, 2024 in connection with International Application No. PCT/US2023/084161.

*Primary Examiner* — Adnan Aziz
(74) *Attorney, Agent, or Firm* — Wolf, Greenfield & Sacks, P.C.

(57) ABSTRACT

Embodiments of a device and methods to operating the same are described that can reliably monitor a plurality of battery systems including a wireless mesh network. The plurality of battery systems are respectively coupled to a plurality of communication devices each configured to receive battery information regarding the battery system coupled thereto. Each communication device may include a communication interface and configured to communicate with other communication devices on a wireless mesh network. Battery information regarding a battery system may be transmitted through the wireless mesh network to reach a gateway. Battery information may further be transmitted from the gateway to a user device, the Internet, or another network for monitoring the battery systems in a communication protocol different from the wireless mesh network. A gateway may be a dedicated gateway device or any of the communication devices on the wireless network.

23 Claims, 9 Drawing Sheets

(56) References Cited

U.S. PATENT DOCUMENTS

| | | | |
|---|---|---|---|
| 2016/0234786 A1* | 8/2016 | Gaja | H04L 43/16 |
| 2019/0242949 A1 | 8/2019 | Lemkin et al. | |
| 2019/0258304 A1* | 8/2019 | Champanis | G06F 1/305 |
| 2020/0036056 A1 | 1/2020 | Thomas et al. | |
| 2020/0288373 A1* | 9/2020 | Kharvar | H04W 40/02 |
| 2020/0374795 A1* | 11/2020 | Hartman | H04W 52/0203 |
| 2021/0135293 A1* | 5/2021 | Hong | H01M 10/482 |
| 2022/0113356 A1 | 4/2022 | Kasselman et al. | |
| 2022/0302745 A1* | 9/2022 | Singer | H02J 7/005 |
| 2022/0407129 A1 | 12/2022 | Phares | |
| 2024/0349056 A1* | 10/2024 | Zeiler | B25F 5/00 |

* cited by examiner

APPARATUSES AND METHODS FOR MONITORING BATTERY SYSTEMS INCLUDING MESH NETWORKS

RELATED APPLICATIONS

This application claims priority under 35 U.S.C. § 119(e) to U.S. Provisional Application Ser. No. 63/433,355, filed Dec. 16, 2022, the content of which is incorporated herein by reference in its entirety for all purposes.

FIELD

Disclosed embodiments are related to devices and methods for monitoring battery systems.

BACKGROUND

A battery may include multiple battery packs physically secured in an enclosure, and electrically connected in a range of electrical configurations. For example, multiple battery packs may be connected in parallel to provide a higher current, or in series to increase output voltage. Further, many battery packs and systems may be provided to customers as modular components that may be assembled together in any number of different configurations with battery packs and/or cells located in series and/or parallel with one another depending on the desired application and overall battery configuration.

SUMMARY

According to some embodiments, a device for providing information regarding one or more battery systems is provided. The device includes: at least one processor configured to be in electronic communication with a first battery system to obtain battery information regarding the first battery system; and a wireless communication interface coupled to the at least one processor and configured to communicate with a plurality of additional devices in a wireless mesh network. Each of the plurality of additional devices is coupled to a respective one of a plurality of second battery systems and configured to obtain battery information regarding the respective second battery system. The at least one processor is further configured to, via the wireless mesh network: (1) transmit the battery information regarding the first battery system to one or more of the plurality of additional devices; and (2) receive, from at least one of the plurality of additional devices, the battery information regarding the respective second battery system to which the at least one of the plurality of additional devices is coupled.

According to some embodiments, a method for monitoring information regarding a plurality of battery systems is provided. The method include: by a device in electronic communication with a first battery system: obtaining battery information regarding the first battery system; transmitting. The method also includes using a first communication interface of the device, the battery information regarding the first battery system to one or more of a plurality of additional devices in a wireless mesh network, where each of the plurality of additional devices is coupled to a respective one of a plurality of second battery systems via the wireless mesh network and configured to obtain battery information regarding the respective second battery system. The method further includes receiving, in the wireless mesh network, from at least one of the plurality of additional devices, the battery information regarding the respective second battery system to which the at least one of the plurality of additional devices is coupled.

According to some embodiments, a non-transitory computer readable medium is provided. The non-transitory computer readable medium includes processor executable instructions that, when executed by one or more processors, perform one or more operations comprising, by a device in electronic communication with a first battery system: obtaining battery information regarding the first battery system; transmitting. The one or more operations also include using a first communication interface of the device, the battery information regarding the first battery system to one or more of a plurality of additional devices in a wireless mesh network, where each of the plurality of additional devices is coupled to a respective one of a plurality of second battery systems via the wireless mesh network and configured to obtain battery information regarding the respective second battery system. The one or more operations further include receiving, in the wireless mesh network, from at least one of the plurality of additional devices, the battery information regarding the respective second battery system to which the at least one of the plurality of additional devices is coupled.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
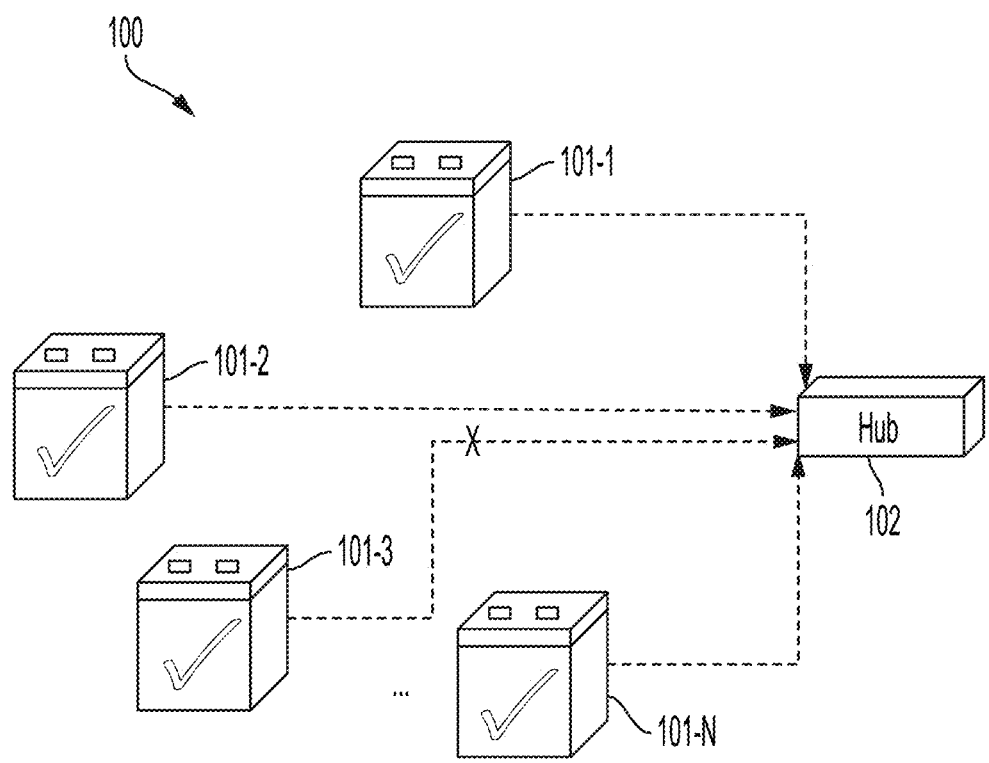
FIG. 1 is an illustrative diagram of devices in a conventional configuration for providing battery information to a user.

Some smart battery systems may include a Bluetooth, or other communication device, inside of the device that allows the user to connect to a single battery system at a time to monitor the status of the battery system. Some battery monitoring systems can communicate with multiple battery systems to collect and provide information about the battery systems to the user. However, the inventors have recognized and appreciated that conventional systems are unable to reliably monitor multiple battery systems. For example, some existing systems use a hub to communicate to one or more battery systems and monitor these battery systems. Thus, when a battery system fails, the communication between the battery system and the hub becomes immediately lost, and no information regarding the failed battery system can be retrieved from the hub. Further, the communication between the hub and the one or more battery systems may not be reliable. This is particularly true when wireless communications are used due to various types of interference. Further, when the hub loses communication with a battery system, there is no way for the hub to determine whether the loss of communication is the result of battery failure, the loss of communication itself, or for other reasons.

To solve the aforementioned technical problems and/or other technical problems, the inventors have recognized and appreciated that it would be advantageous to provide battery systems with redundant communication and/or to record information regarding a battery system before the battery system fails, and to be able to retrieve such information after the battery system fails. In such cases, recent information regarding the failed battery system recorded before the failure occurred may be used to determine or predict the cause of the failure. As noted above, the inventors have also recognized and appreciated that it would be advantageous to transmit information regarding a battery system to multiple other battery systems redundantly such that if one system fails and/or communication from one battery system to a battery monitory system is interrupted, the information regarding the battery system may be reliably provided to the battery monitory system through the other systems. In view of the above, in some embodiments, the inventors have recognized and appreciated that the redundant communications among the multiple battery systems may be realized in a wireless mesh network, in which each battery system communicates with one or more other systems on the network. Furthermore, the inventors have recognized and appreciated that it would be advantageous to couple a communication device (e.g., a dongle) to an existing battery system such that any existing battery system can be communicative in a wireless mesh network and provide battery information to a user and/or other associated system via the wireless mesh network. Furthermore, the inventors have recognized and appreciated that it would be advantageous to include a backup power source (e.g., a backup battery) in the communication device such that, if a battery system fails, the communication device coupled to the battery system can still operate on the backup battery and transmit some useful information regarding the failed battery system to other communication devices on the wireless mesh network.

In view of the foregoing, the inventors have developed new technologies for reliably monitoring a plurality of battery systems. Described herein are various techniques, including systems, computerized methods, and non-transitory instructions, that monitor multiple battery systems in a wireless mesh network via redundant data communication. In some embodiments, multiple battery systems may each be coupled to a respective communication device such that the multiple battery systems may form a wireless mesh network, on which battery information regarding the multiple battery systems may be transmitted.

In some embodiments, multiple communication devices that are respectively associated with the multiple battery systems may be communicative to each other via a wireless mesh network. Each communication device may include at least one processor configured to be in electronic communication with the associated battery system to obtain battery information thereof via an interface (e.g., a serial interface). The communication device may also include a wireless communication interface coupled to the processor and configured to communicate with a plurality of other such communication devices on the wireless mesh network. The processor in each communication device, which is coupled to a respective battery system, may transmit the battery information regarding the battery system to each of the other communication devices on the wireless mesh network to realize redundant communication. Examples of battery information may include the status of the battery system, for example, the charge state, the load, the voltage, the current, and/or other conditions. The battery status information may also include a warning/error code that indicates one or more operating conditions of the battery system that are beyond a normal range. For example, for a 12v battery system, if the charging voltage is above 14v, the battery system may transmit a warning/error code that indicates overcharge. Additionally, and/or alternatively, examples of battery information may also include information of the battery system obtained from sensors in the batter system, such as coulomb counters, voltage sensors, current sensors, temperature sensors, etc. It is appreciated that some battery information may be based on the readings of the sensors. For example, an overcharge warning/error code may be generated based on the voltage sensor in the batter system.

Further, the processor in each communication device may also be configured to receive, from other communication devices on the wireless mesh network, the battery information regarding the battery systems to which the other communication devices are coupled. Furthermore, the processor in each communication device may also be configured to transmit the battery information received from another communication device to at least a third communication device on the wireless mesh network.

In some embodiments, a communication device may be coupled to a respective one of the plurality of battery systems and configured to be in electronic communication (e.g., a serial interface) with the respective battery system to obtain battery information thereof. In some examples, the communication device may be a separate device that is pluggable to an existing battery system (e.g., via port such as a serial interface). In other examples, the communication device may be implemented in a semiconductor chip that is part of the battery system. In these configurations, the communication device may receive battery status information and/or other battery sensor information from the battery system.

In the configurations described herein, multiple battery systems can be reliably monitored and provided to the user. For example, if a single communication device fails to communicate, data containing battery information regarding the battery system to which the single communication device is coupled will not be lost. Instead, such data may have already been received by another communication device or a gateway on the wireless mesh network, which will be further transmitted through other communication devices on the mesh network and provided to the user and/or another associated system. Alternatively, such data may be previously stored in the communication device coupled to the failed battery system. Upon battery system failure, the communication device coupled thereto may transmit the battery information that was previously stored on the communication device to other communication devices on the wireless mesh network.

In some embodiments, the battery information regarding the multiple battery systems on the wireless mesh network can be provided to a user device via a gateway. A gateway may be capable of connecting to different networks via different communication protocols. For example, a gateway may be communicative with multiple battery systems via the wireless mesh network and configured to receive the battery information of any of the battery systems on the wireless mesh network. The gateway may also be configured to communicate with a user device, the Internet, or another network via a different communication protocol other than the wireless mesh network.

Via redundant communication described herein on the wireless mesh network, the battery information regarding one of the battery systems may be received at the gateway via one or more hops on the wireless mesh network. For example, at the gateway, information regarding one battery system may be received directly from the communication device coupled to the battery system. Alternatively, and/or additionally, the information regarding that battery system may be received from a communication device of another battery system indirectly. In some embodiments, a gateway may be a dedicated device. In such a configuration, the gateway may not be in direct communication with any of the battery systems. Instead, the gateway may be configured to be communicative with the multiple communication devices respectively associated with the multiple battery systems to receive the battery information of the battery systems via the wireless mesh network. In some embodiments, a gateway may also be one of the multiple communication devices respectively associated with the multiple battery systems, where that gateway may be configured to communicate in multiple communication protocols and operate as a gateway.

In some embodiments, a gateway may be configured to communicate the battery information received at the gateway to a user device or another network via a communication protocol different from the protocol used in the wireless mesh network. For example, the gateway may communicate with various communication devices coupled to respective battery systems via a wireless mesh network (e.g., a Wi-Fi network) to receive battery information regarding the battery systems, and communicate with a user device (e.g., a smart phone) via a different communication protocol (e.g., Bluetooth) to provide the received battery information to the user device. In another non-limiting example, the gateway onboard a vehicle in which the battery systems are installed may be configured to connect to a controller area network (CAN) of the vehicle via a communication interface (e.g., a CAN bus), and transmit the battery information to the CAN of the vehicle. In another non-limiting example, the gateway may be configured to connect to the Internet via a different communication protocol (e.g., a cellular network or Ethernet) and transmit the battery information to the Internet (e.g., a cloud computing system) for use with any battery monitoring system. Thus, it should be understood that the disclosed methods and systems are not limited to interfacing and/or communicating with any specific secondary devices and/or systems.

In some embodiments, each communication device coupled to a respective battery system may be powered by the respective battery system. Alternatively, and/or additionally, the communication device may have a backup battery, which enables the communication device to continue operating when the battery system coupled to the communication device fails (e.g., power is down). Accordingly, the communication device may be configured to operate in at least a low power mode, a transmission power mode, and/or a combination thereof. The low power mode may enable the communication device to work in a power saving mode. For example, in the low power mode, the communication device may only perform a subset of operations (e.g., only receiving wake-up signals from a battery system or receiving warning/error codes from other communication devices) while suspending other operations (e.g., suspending transmitting any battery information to other communication devices or the gateway). The low power mode may enable the communication device to prolong the life of the backup battery when the communication device is powered solely by the backup battery. In the transmission power mode, the communication device may be fully functional, and is configured to transmit battery information to the wireless mesh network (and/or the gateway or user device). As described further below, the low power mode and transmission power mode may be selectively alternated with one another to provide desired power consumption and communication needs for a desired application. Of course, embodiments in which different operating modes are used and/or a communication device is not operated in a lower power mode are also contemplated as the disclosure is not so limited.

In some embodiments, various conditions or a combination thereof may trigger a communication device to operate in different power modes or switch between them. In some embodiments, the communication device is configured to operate in the low power mode responsive to a determination that one or more conditions or a combination thereof are satisfied. The one or more conditions include: a power state of the battery system to which the communication device is coupled is unchanged for a period of time; there is no load applied to the battery system; or no communication is received from any of the other communication devices on the wireless mesh network for a period of time.

In some embodiments, the communication device is configured to operate in the transmission power mode responsive to a determination that one or more conditions or a combination thereof are satisfied. The one or more conditions include: a wake-up signal is received from the battery system to which the communication device is coupled; a determination that a fault has occurred at the battery system; a power state of the battery system changes; a period of time elapses after the communication device changing to operation in the lower power mode; a fault that has previously occurred at the battery system is resolved; or a communication is received from at least one of the other communication devices on the wireless mesh network.

In some embodiments, when a communication device coupled to a battery system is operating in the low power mode, the communication device is first woken-up (e.g., switching to the transmission power mode) before receiving any battery information. A battery system, which is about to send a warning/error code, may be configured to first send a wake-up signal, followed by the warning/error code to the communication device. When the communication device receives the wake-up signal, the communication device switches to operate in the transmission power mode, then communicates with the communication device to further receive the battery information.

In some embodiments, in case a battery system fails (e.g., powered down), the communication device coupled thereto may automatically switch to use the backup battery. Since the communication between the communication device and the battery system is lost due to the battery system failure, the communication device may be configured to determine the battery information of the battery system based on previously obtained information and transmit that information to the wireless mesh network. For example, responsive to determining that the battery system is powered down, the communication device may determine whether a previous warning/error code had occurred at the battery system. This may be implemented, for example, by the communication device periodically storing battery information of the battery system to which the communication device is coupled. When the battery system completely fails, the communication device may check if any warning/error code of the battery system is stored in the non-transitory computer readable memory of the communication device. If it is determined that a previous warning/error code had been previously received and stored in the communication device, the communication device may determine an error code that indicates an error had occurred at the battery system and transmit that error code to the wireless mesh network.

In some embodiments, in case of a battery system fails, a communication device may predict what might have occurred to the battery system based on the most recent warning/error code of the battery system. For example, responsive to determining that a previous warning/error occurred at the battery system (e.g., a previous temperature warning code of the battery system is found in the memory of the communication device), the communication device may predict that the battery system failed due to a temperature error, and subsequently transmit a temperature error code (or previous warning/error code) to other communication device(s) on the wireless mesh network. Responsive to determining that no previous warning/error had occurred at the battery system (e.g., no warning/error code is found in the memory), the communication device may transmit a default code indicating an error (e.g., short circuit, power down, etc.) to other communication device(s) on the wireless mesh network. Accordingly, even when a battery system completely fails, the communication device coupled thereto can still operate and provide the most recent status of the battery system to the wireless mesh network.

It is appreciated that variations of the communication devices described herein according to aspects of the present application may be possible. For example, although various embodiments are described herein to obtain battery information and provide the battery information to a user device or network via a wireless mesh network, such embodiments can also be implemented in a two-way manner in that a communication device associated with a respective battery system can also transmit information and/or a control signal to the battery system based in part on received battery information and/or commands from any other communication device(s) on the wireless mesh network. For example, a gateway may receive a control signal from a user device or the Internet, and transmit the control signal to a battery system via the wireless mesh network.

Moreover, aspects of the present application may provide a method for using the communication device as described herein to provide information regarding any battery system in the multiple battery systems. Each of these battery systems may have multiple battery packs that contain high level status information and low level status information. It should be understood that any appropriate high level and low level information associated with an individual battery pack may be used with the systems and methods disclosed herein. Examples of such battery information that may be monitored from the individual battery packs using any appropriate type of sensor may include, but is not limited to, a voltage, a current, a block imbalance, a temperature, a high temperature condition (e.g. temperature above a threshold temperature as measured by a temperature sensor), a Coulomb count, and/or any other appropriate status information regarding an individual battery pack, which depending on the embodiment may include one or a plurality of cells. Appropriate types of sensors that may be included in the battery pack to provide the desired battery information may include, but are not limited to, coulomb counters, voltage sensors, current sensors, temperature sensors, state of health monitors, and/or any other appropriate types of sensor.

In some embodiments, the wireless communication protocol as described herein for communications between devices, or a gateway, and/or a user device may be Bluetooth, Zigbee, 802.11 Wi-Fi, Sub-1 GHz radio frequency (RF) connectivity, RFID (Radio-Frequency Identification), NFC (Near-Field Communication), cellular network, or other appropriate wireless communication protocol. A battery may provide energy storage for a consumer or industrial user to power a household as off-grid storage, vehicles such as a car, a recreational vehicle (RV) or a boat, consumer electronics, industrial machinery, and/or any other appropriate application. Battery packs within a battery may be modules that include one or more electrochemical cells that can be implemented in any suitable form and from any battery provider. In some embodiments, the battery packs may also be flexibly rearranged into different electrical configurations such as series/parallel and into different physical configurations such as stacking or arrangement in different positions and/or orientations.

In an exemplary use scenario, a user device may enable the user to interact with the gateway to obtain information regarding the battery system(s), for example using a user interface (UI) either in the gateway itself, or on an external electronic device such as but not limited to a smart phone, a portable computer, a tablet computer, smart watch or other wearable device, a Bluetooth paired keyboard, touchpad or mouse, and any other suitable interface. The gateway may receive the user input and provide battery information regarding one or more of the multiple battery systems to the user (e.g., via a user interface).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is an illustrative diagram of devices in a conventional configuration 100 for providing battery information to a user. As shown, a hub 102 directly communicates with one or more battery systems, e.g., 101-1, . . . , 101-N, and monitors these battery systems. However, when a battery system fails, e.g., 101-3, the communication between the battery system 101-3 and the hub 102 becomes immediately lost, thus, no information regarding the failed battery system 101-3 can be retrieved from the hub 102. Further, the communication between the hub 102 and the one or more battery systems 101-1 . . . N may not be reliable due to various types of interference that may affect communication between the hub and any one of the depicted battery systems. When the hub 102 loses communication with a battery system, e.g., 101-3, there is no way for the hub to determine whether the loss of communication is the result of battery failure or the loss of communication itself, or for other reasons. Accordingly, various techniques are developed to overcome the above described technical problems and/or other problems, as described further herein.

Figure 2A:
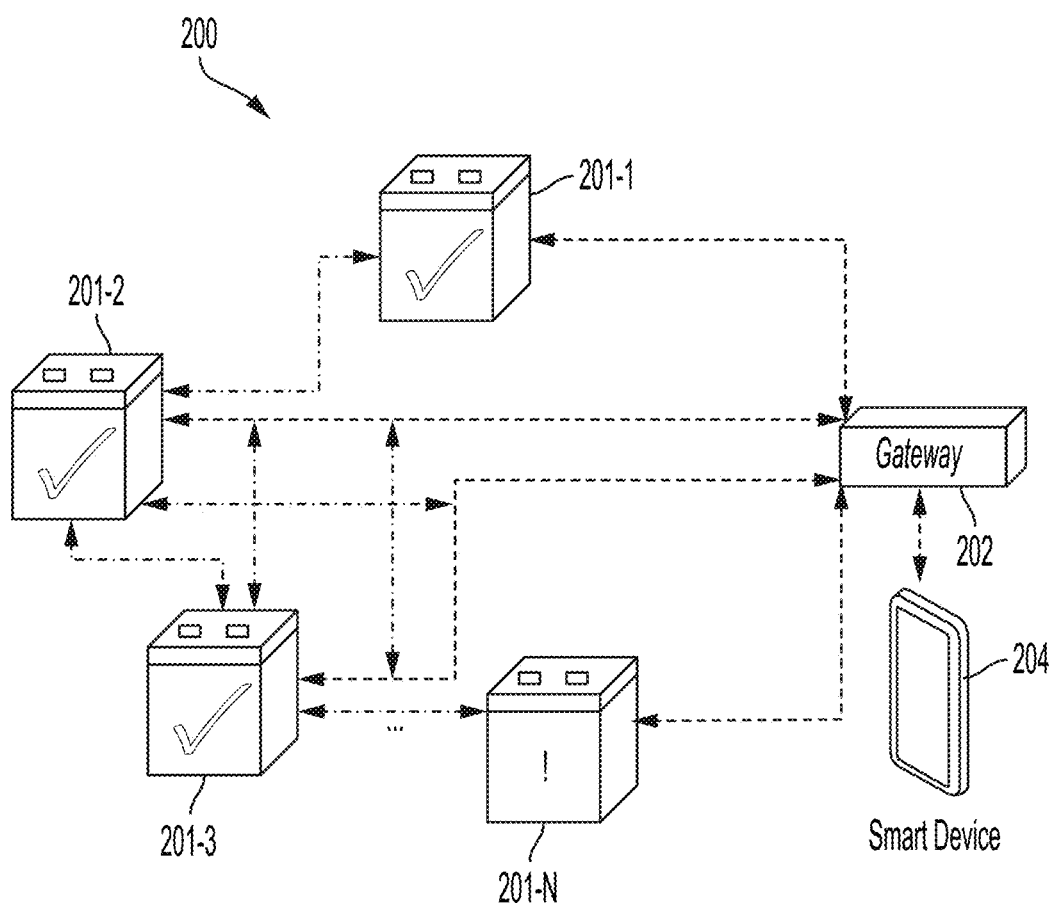
FIG. 2A is an illustrative diagram of communication devices communicative in a wireless mesh network for providing battery information to a user device via a gateway, according to some embodiments.
Figure 2B:
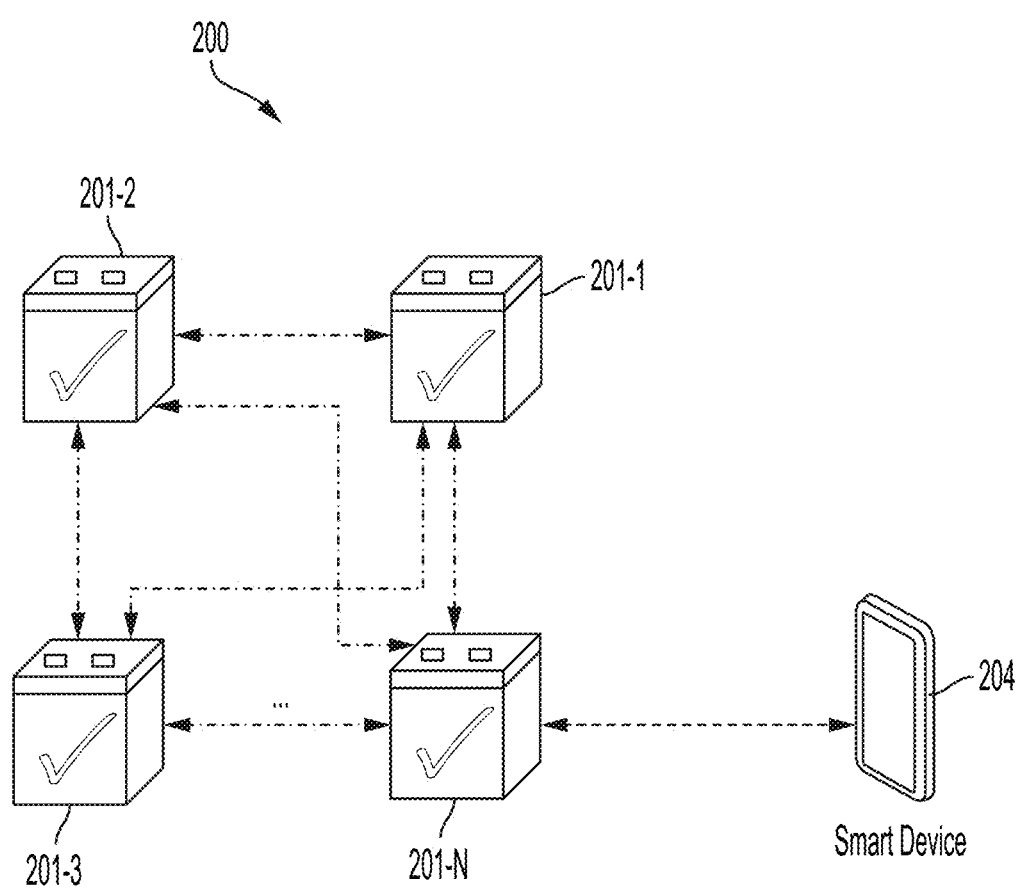
FIG. 2B is an illustrative diagram of communication devices communicative in a wireless mesh network for providing battery information to a user device via one of the communication devices on the wireless mesh network, according to some embodiments.

FIGS. 2A and 2B illustrate various configurations of a wireless mesh network having multiple battery systems thereon. The reference numerals 201s (e.g., 201-1, 201-2, 201-3, . . . , 201-N) are used to illustrate the multiple battery systems and/or multiple devices associated with the battery systems. In some examples, each of these reference numerals 201s may indicate an enclosure, which includes a battery system coupled with a respective communication device described above and further herein. In other examples, the communication device associated with a respective battery system may be part of the battery system. Additionally, embodiments in which separate battery systems that are not included within a fixed enclosure are used are also contemplated. For example, separate battery systems including separate battery housings with the one or more electrochemical cells disposed therein may be used with either separate and/or integrated communication devices as the disclosure is not so limited.

FIG. 2A is an illustrative diagram of communication devices communicative in a wireless mesh network 200 for providing battery information to a user device via a gateway 202, according to some embodiments. As shown, multiple communication devices 201-(1 . . . N) may each be coupled to a respective battery system to obtain the battery information thereof. The multiple communication devices may be configured to communicate with each other in a wireless mesh network 200. In some embodiments, each communication device may include at least one processor configured to be in electronic communication with the associated battery system to obtain battery information thereof. The communication device may also include a wireless communication interface (e.g., transmitter/receiver operable over radio) coupled to the processor and configured to communicate with a plurality of other such communication devices (e.g., one or more of communication devices 201s) on the wireless mesh network 200. In such a configuration, battery information regarding any of the communication devices on the wireless mesh network may be transmitted among these communication devices (e.g., 201s, and gateway 202) in a given wireless mesh network topology.

In a non-limiting example, the mesh network topology may be a full mesh, in which the multiple communication devices (operable as nodes in the wireless mesh network) may each communicate the battery information to each of the other communication devices on the wireless mesh network. In another non-limiting example, the mesh network topology may be a partial mesh, in which battery information on one communication device may be communicated to one or more other communication devices (e.g., neighboring node(s)), then hops via other node(s) until it reaches the gateway, which is further described.

A gateway may be capable of connecting to different networks via different communication protocols. For example, gateway 202 may be communicative with multiple battery systems (e.g., 201s) via the wireless mesh network 200 and configured to receive the battery information of any of the battery systems on the wireless mesh network. The gateway 202 may also be configured to communicate with a user device 204 (e.g., a smart device, such as a smart phone or any suitable electronic device) in a different communication protocol (e.g., a different radio frequency (RF) other than the RF used for the wireless mesh network) and transmit the battery information to the user device 204 via that communication protocol. In non-limiting examples, the wireless mesh network 200 may be operable over Wi-Fi, cellular network, or using any other suitable RF communication protocol. The communication between gateway 202 and user device 204 may be operable over short-range communication protocols, such as Bluetooth, near-field communication (NFC) or other suitable communication protocols.

As shown in FIG. 2A, gateway 202 may be a dedicated gateway device. A dedicated gateway may not be in direct communication with any of the battery systems. Instead, the gateway may be configured to be communicative with the multiple communication devices respectively associated with the multiple battery systems (e.g., 201) via the wireless mesh network 200 to receive the battery information of the battery systems. As previously described, battery information regarding a battery system may take one or more hops on the wireless mesh network to reach the gateway 202 depending on the topology of the wireless mesh network. It is appreciated that although an example of a dedicated gateway 202 is shown, another device (e.g., one of the multiple communication devices associated with the multiple battery systems 201) may be configured to operate as a gateway. This is further described with reference to FIG. 2B.

FIG. 2B is an illustrative diagram of communication devices communicative in a wireless mesh network 200 for providing battery information to a user device 204 via a communication device (e.g., device 201-N), according to some embodiments. In comparison to FIG. 2A, communication device 201-N in FIG. 2B is operating as a gateway and configured to provide the battery information on the wireless mesh network to the user device 204. Similar to gateway 202 (in FIG. 2A), device 201-N in FIG. 2B may connect to the wireless mesh network 200 via a first communication protocol and communicate with the user device 204, or other system, via a second communication protocol different from the first communication protocol. Similar to the examples shown in FIG. 2A, the first communication protocol may be Wi-Fi, cellular network, or any other suitable RF communication protocol, whereas the second communication protocol may be short-range communication protocols, such as Bluetooth, near-field communication (NFC) or other suitable communication protocols. Being different from embodiments in FIG. 2A, the gateway device 201-N in FIG. 2B can be any communication device coupled to a respective battery system. In other words, gateway 201-N may be directly communicative with an associated battery system, whereas gateway 202 (FIG. 2A) is not.

With further reference to FIGS. 2A and 2B, in other embodiments, the gateway (e.g., 202 in FIG. 2A, 201-N in FIG. 2B) may be configured to connect to another network other than the wireless mesh network 200. For example, the gateway may be onboard a vehicle in which the battery systems (e.g., 201s) are installed, and the gateway is configured to connect to a controller area network (CAN) of the vehicle via a communication interface (e.g., a CAN BUS), and transmit the battery information to the CAN of the vehicle. In another non-limiting example, the gateway may be configured to connect to the Internet via a different communication protocol (e.g., a cellular network or Ethernet) and transmit the battery information to the Internet (e.g., a cloud computing system) for use with any battery monitoring system.

Figure 3:
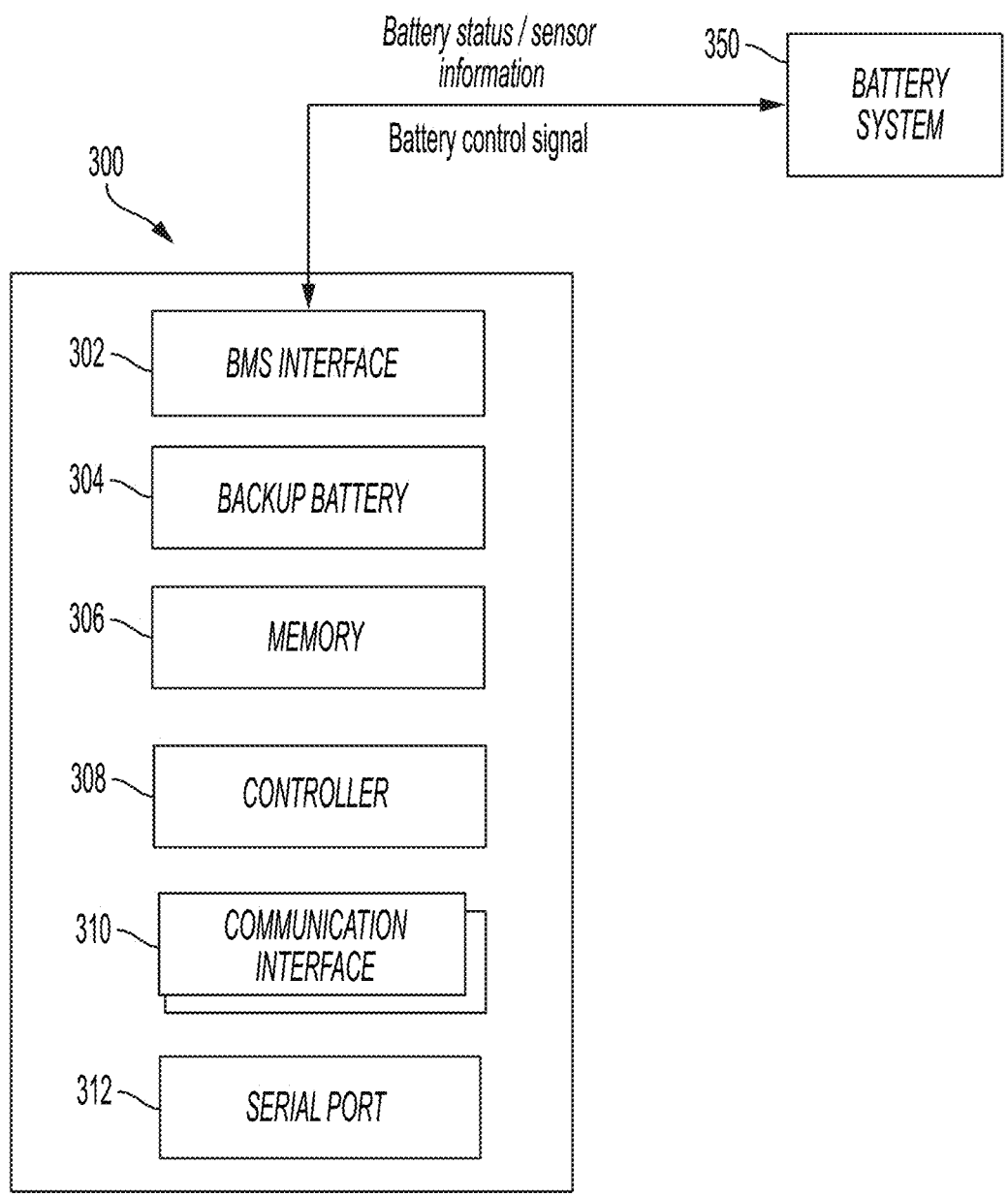
FIG. 3 is an illustrative block diagram of components of an exemplary implementation of a communication device as shown in FIGS. 2A-2B that may be included in a battery system, according to some embodiments.

FIG. 3 is an illustrative block diagram of components of an exemplary implementation of a communication device 300. The communication device 300 may be coupled to a battery system 350. In some embodiments, the communication device 300 may be implemented in any of the battery systems 201s, e.g., communication device coupled thereto, as shown in FIGS. 2A-2B. Battery system 350 may be any of the battery systems 210s as shown in FIGS. 2A-2B. In some embodiments, communication device 300 may include a controller 308, such as a microcontroller unit (MCU) or any other controller or processor. Communication device 300 may include a battery management system (BMS) interface 302 configured to communicate with a respective battery system, e.g., 350, to receive and transmit information from/to the battery system. In some embodiments, the BMS interface 320 may be a UART (Universal Asynchronous Receiver/Transmitter) interface. Thus, communication device 300 may be configured to communicate with the battery system 350 via the UART interface to obtain battery information of the battery system 350. In some examples, communication device 300 may be a dongle that is pluggable to an existing battery system 350 (e.g., via UART interface) to receive battery status information from the battery system 350. However, embodiments in which the communication device is integrated with the BMS of a battery system are also contemplated. Examples of battery status information may include charge states and/or warning/error codes (e.g., overcharge and overcharge warning, undercharge and undercharge warning, no load, or state of charge). Examples of the warning/error codes may also include over temperature, under temperature, short circuit, battery block imbalance, or high current.

It is appreciated that a warning/error code may indicate whether the code is a warning or an error depending on the operation conditions of the battery system. In a non-limiting example, a high current error code may occur when the battery is operating with a current greater than a threshold current. This may either be an absolute threshold current and/or a threshold current that is exceeded for a period of time. For example, when a battery system is operating at up to 200A for 30 seconds (or other suitable combination of current and time period) or over 300A for 0.5 second (or other suitable combination of current and time period), the battery system may send a high current warning code to the communication device, e.g., 300. In other examples, when the battery system is operation at over 300A for over 1 second, the battery system may send a high current error code to the communication device. In some embodiments, when the high current error occurs, the battery system may cut off for a time period (e.g., five seconds or other suitable time period) and recover power after the time period.

In some embodiments, communication device 300 may receive further receive other battery information, such as battery sensor information from various sensors in the battery system 350. For example, the various sensors in the battery system 350 may include, but not limited to, coulomb counters, voltage sensors, current sensors, temperature sensors, state of health monitors, and/or any other appropriate type of sensor, to provide the desired battery information.

In some embodiments, communication device 300 may receive power from the battery system 350 via the BMS interface 302. For example, the UART interface may include a pin to provide power from the battery system 350 to the device 300. Additionally, and/or alternatively, device 300 may include its own power 304, such as a backup battery. In a non-limiting example, the backup battery may include a coin cell, a prismatic cell, a pouch cell and/or any other appropriate type of backup battery. The backup battery may include one or more primary electrochemical cells and/or the backup battery may include one or more rechargeable secondary electrochemical cells. In some embodiments, device 300 may operate on the power from the battery system to which the device is coupled (e.g., battery system 350). In the event that the battery system 350 loses power, the device 300 may operate on its own backup battery. Depending on whether the device 300 operates based on the power from the battery system or the backup battery, and/or other conditions, the device may operate in different power modes to preserve energy from the backup battery. In some embodiments, the battery system 350 may first send a wake-up signal to the communication device 300 before sending the battery information. As such, the communication device may be configured to receive a wake-up signal during a lower power mode. After receiving the wake-up signal, the communication device may switch to a transmission power mode that consumes more power than the lower power mode to further receive the battery information from the battery system 350. The operations of power modes are further described in the present disclosure with an example power scheme shown in FIG. 8.

Now, with further reference to FIG. 3, device 300 may further include one or more communication interfaces, e.g., 310. In some embodiments, communication interface(s) 310 may include a first communication interface to enable the device to communicate over the wireless mesh network described above in a first communication protocol. For example, communication device 300 may transmit battery information regarding battery system 350 to one or more other communication devices on the wireless mesh network as described above. Communication device 300 may also receive battery information regarding other battery system(s) from other device(s) on the wireless mesh network. Additionally, communication interface(s) 310 may include a second communication interface to enable the communication device to operate also as a gateway device and communicate the battery information received from the wireless mesh network to a user device or another network in a second communication protocol different from the first communication protocol. The examples of the first and second communication protocols are described in embodiments of FIGS. 2A and 2B above.

Optionally, communication device 300 may include other interfaces, such as serial port 312. In such an embodiment, communication device 300 may be used as a test point in communication with another device, such as a testing device. The testing device may use the serial port 312 to program the device (e.g., initial parameters setup).

With further reference to FIG. 3, communication device 300 may further include memory 306 configured to store data, such as battery information regarding the battery system 350. The stored data may be used by communication device 300. For example, in the event of power down for the battery system, communication device 300 may use the battery information previously stored in the memory 306 to predict what might have happened to the battery system, and transmit the predicted error code or the previously stored data to other communication devices on the wireless mesh network. The memory 306 may be volatile or non-volatile, such as a RAM, DRAM, NAND flash, a SD card, a soldered flash, or any other suitable storage device. In some embodiments, communication device 300 may be configured to log data in the memory 306 under certain conditions.

Figure 6:
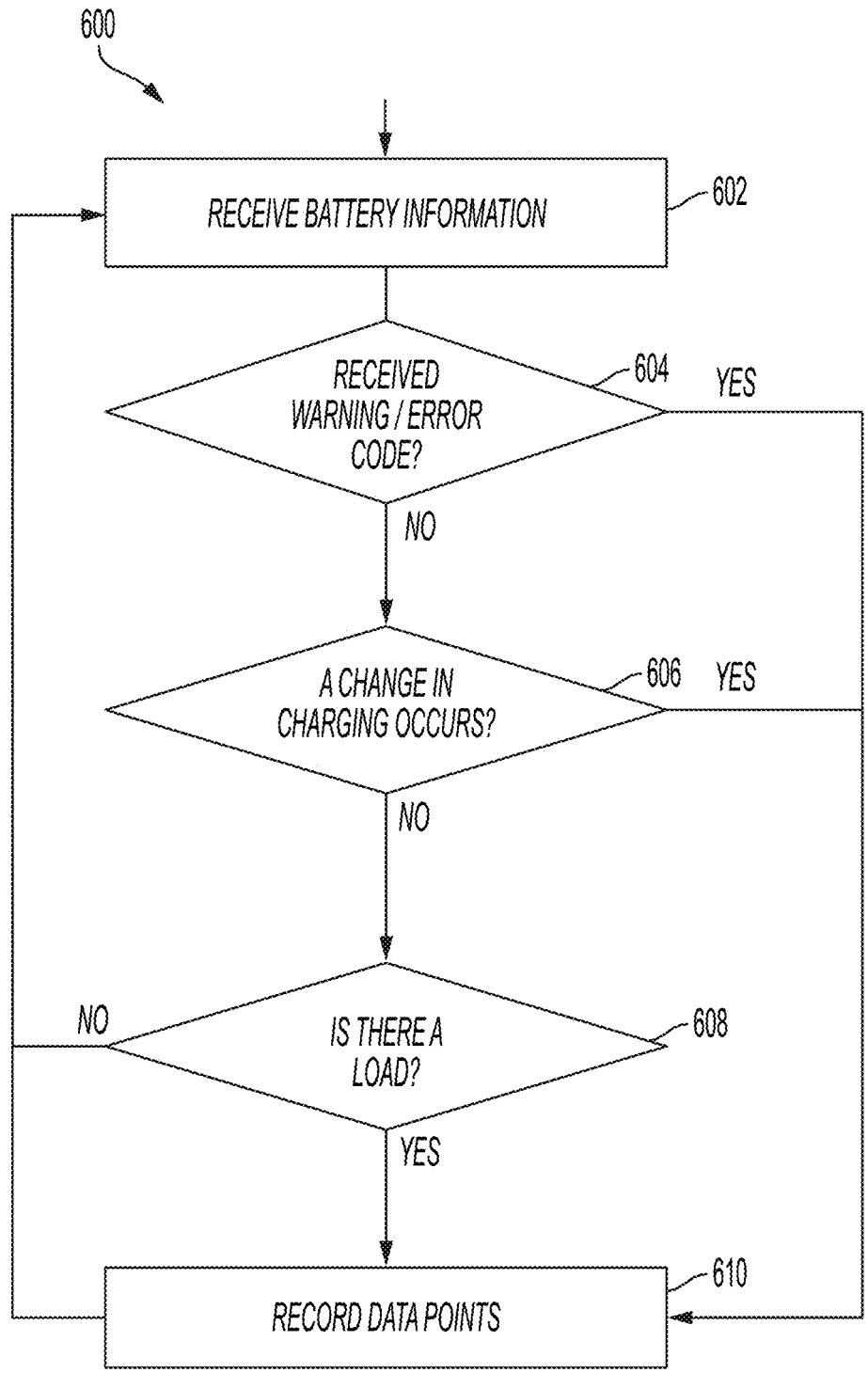
FIG. 6 is a flow diagram of an exemplary method for recording data points based on various conditions in a communication device as shown in FIGS. 2A-2B and/or FIG. 3, according to some embodiments.

FIG. 6 is a flow diagram of an exemplary method for recording data points in a memory (e.g., 306) of device 300. In some embodiments, method 600 may be implemented in communication device 300, and/or any communication device shown in FIGS. 2A and 2B (e.g., device 201s). Method 600 may include receiving battery information at operation 602. For example, communication device 300 may receive battery information from battery system 350 via BMS interface 302 as describe and further herein. Method 600 may further include determining whether a warning/error code is received from the battery at operation 604. In response to determining that a warning/error code is received from the battery, method 600 may proceed with recording such warning/error code at operation 610.

With further reference to FIG. 6, method 600 may further include determining whether a change in charging state (e.g., charger stops, charger starts etc.) occurred at the battery system at operation 606. In response to determining that a change in charging state occurred, method 600 may proceed with recording such charging state at operation 610. In some embodiments, method 600 may also include determining if a load is applied at the battery system at operation 608. In response to determining that a load is applied at the battery system, method 600 may proceed to recording data points associated with the battery system, such as current/voltage, state of charge, the load, or temperature of the battery system, etc. It is appreciated that various operations, such as 604-608 are described only as an example. However, the various conditions may include more or fewer than what is described in 604-608. Furthermore, the order of operations 604-608 may also vary. For example, operation 608 may be optional. In another variation, operation 608 may be performed before operation 606 is performed.

Returning to FIG. 3, it is appreciated that various components (e.g., 302-312) of communication device 300 may each be a standalone component (e.g., backup battery 304). In variations, one or more components may be integrated together. For example, controller 308 and/or other components e.g., communication interface 310 and/or other components, may be implemented in an integrated circuit. In a non-limiting example, an evaluation board, e.g., NRF52840 manufactured by Nordic Semiconductor ASA, may be provided that integrates controller 308, one or more communication interfaces 310, and/or additional components. For example, NRF52840 may provide mesh radio and also supports low power communication protocols, such as Bluetooth, Zigbee, Tread, for example, at 2.4 GHz frequency.

Furthermore, although it is described that communication device 300 may be implemented as a dongle pluggable to a battery system (e.g., 350), it is appreciated that other configurations may be possible. For example, an integrated circuit (e.g., an ASIC) may be provided that implements communication device 300 and is integrated into the battery system 350. For example, such semiconductor chip may be connected to existing circuitry of the battery system and receive battery status information from the existing circuitry as analog/digital inputs. Additionally and/or alternatively, the semiconductor chip may be coupled to one or more sensors in the battery system, as described above (e.g., coulomb counters, voltage sensors, current sensors, temperature sensors, state of health monitors, and/or any other appropriate type of sensors) to receive battery sensor information as analog/input. In some embodiments, the chip may also be coupled to existing shunt & circuitry of the battery system to receive other signals, e.g., analog battery voltage. In some embodiments, the semiconductor chip may include communication interface such that the chip may connect to a wireless mesh network. In other embodiments, the chip may provide digital outputs which can be provided to external devices via an interface, e.g., a UART connector.

Figure 4:
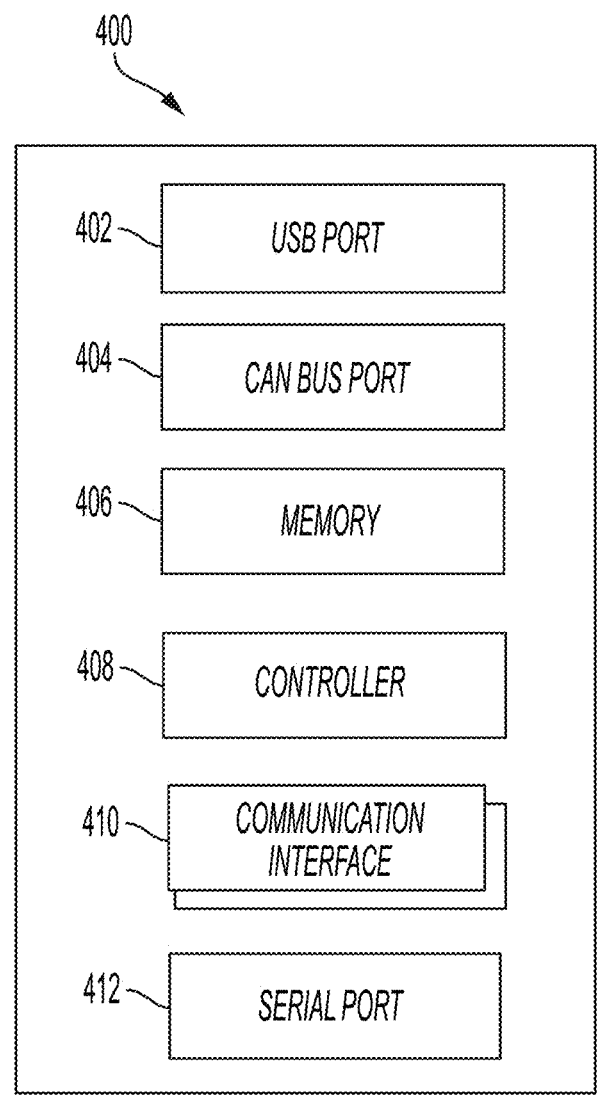
FIG. 4 is an illustrative block diagram of components of an exemplary implementation of a gateway as shown in FIG. 2A that may be communicative in a wireless mesh network for providing battery information regarding a battery system installed in a vehicle to a controller area network (CAN) of the vehicle, according to some embodiments.

FIG. 4 is an illustrative block diagram of components of an exemplary implementation of a gateway 400 as shown in FIG. 2A. In some embodiments, gateway 400 may be similar to device 300 (in FIG. 3) which, as described above, may be configured to operate as a gateway. The difference is that gateway 400 may be a dedicated gateway, which can implement device 202 (in FIG. 2A). Thus, gateway 400 may not directly communicate with any battery system. Rather, gateway 400 may be configured to connect to the wireless mesh network (e.g., 200 in FIG. 2A) and obtain battery information regarding the battery systems from respective communication devices (e.g., 300 in FIG. 3) to which the battery systems are connected. As such, BMS interface (e.g., 302 in FIG. 3) is not needed in gateway 400.

In some embodiments, gateway 400 may have a similar structure as device 300 (FIG. 3). As shown in FIG. 4, gateway 400 may have a controller 408, memory 406, one or more communication interfaces 410, and/or a serial port 412, as similarly described with respect to controller 308, memory 306, one or more communication interfaces 310, and/or a serial port 312 in FIG. 3. For example, gateway 400 may be configured to use a first communication interface (e.g., 410) to connect to multiple communication devices respectively coupled to multiple battery systems via a wireless mesh network to obtain battery information regarding the battery systems, where the wireless mesh network is operating in a first communication protocol. Gateway 400 may be configured to use a second communication interface (e.g., 410) to connect to a user device in a second communication protocol (e.g., Bluetooth) and transmit the battery information to the user device. An example of user device is shown as 204 (FIG. 2A) and further described in embodiments of FIG. 2A.

In some embodiments, gateway 400 may be configured to transmit the battery information to another network. In the example in FIG. 4, gateway 400 may be onboard a vehicle in which the battery systems are installed. Gateway 400 may additionally include a CAN BUS port 404 configured to connect to a CAN of the vehicle and transmit battery information through the CAN to the vehicle, as described herein. In some examples, the CAN BUS may be implemented as a RJ45 port, which may include both power and CAN BUS connections. In some examples, power over the CAN may be limited, e.g., to under 200 mA and 9-16 DC volts. Alternatively, and/or additionally, gateway 400 may include other serial interfaces (e.g., USB port 402) to receive power via the serial port. Although it is shown that gateway 400 may be implemented to communicate with a CAN onboard a vehicle, gateway 400 may be configured to connect to other devices and/or interfaces and transmit the battery information. For example, gateway 400 may be configured to interface with a vehicle automatic identification (AIS) system in a similar manner as gateway 400 for CAN, but via a 5-wire connector, which provides power, analog in for measured alternator output (e.g., 0-60 v) and analog output (e.g., field wire: feedback control of voltage regulation). As such, gateway 400 may be used to transmit battery information to the AIS of the vehicle. In view of the above, it should be understood that the gateways, communication devices, and associated methods disclosed herein are not limited to any particular type of secondary communication protocol and/or connection as the disclosure is not so limited.

Various embodiments described in FIGS. 2A-4 provide advantages over conventional battery monitoring systems in that battery information regarding multiple battery systems can be reliably monitored and provided to the user. This is further illustrated with example processes that may be implemented in the various embodiments described further herein with references to FIGS. 5-8.

Figure 5:
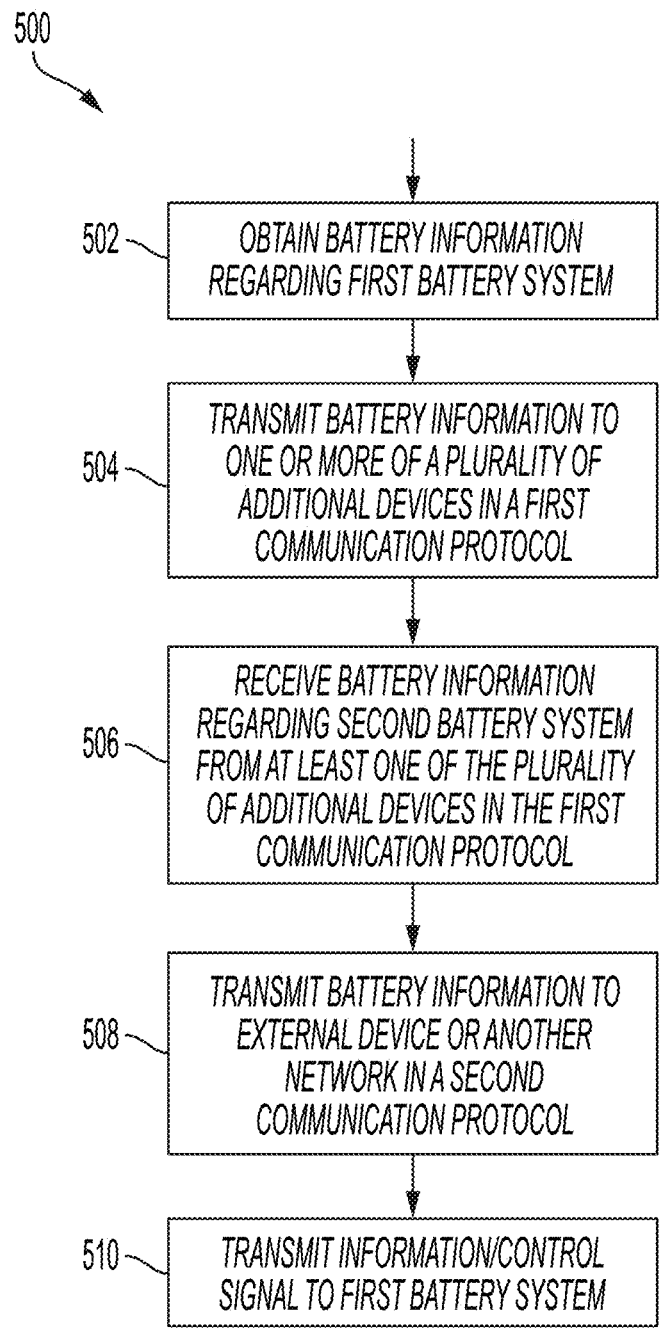
FIG. 5 is a flow diagram of an exemplary method for providing information regarding a battery system using multiple communication devices in a wireless mesh network as shown in FIGS. 2A-2B and/or FIG. 3, according to some embodiments.

FIG. 5 is a flow diagram of an exemplary method 500 for providing information regarding a battery system using multiple devices in a wireless mesh network, according to some embodiments. Method 500 may be implemented in devices as shown in FIGS. 2A-2B (e.g., 201), and/or FIG. 3 (e.g., 300). Method 500 may include obtaining, at operation 502, battery information regarding a battery system; and transmitting battery information to other devices on the wireless mesh network, at operation 504. For example, with reference to FIG. 2A, any of communication devices 201s may be implemented as 300 (FIG. 3) and coupled to a respective battery system 350 (FIG. 3) to obtain battery information therefrom. Any of the communication devices 201s may also transmit the battery information to one or more other communication devices 201s on the wireless mesh network 200. Method 500 may further include receiving battery information regarding other battery systems on the wireless mesh network, at operation 506. In the example in FIG. 2A, any of the communication devices 201s may receive battery information from other communication devices 201s on the wireless mesh network 200. As previously described, the topology of the wireless mesh network can be full mesh or partial mesh. In a full mesh topology, battery information received at one communication device may be transmitted directly to all other communication devices on the wireless mesh network. In a partial mesh topology, battery information received at one communication device may be transmitted to another communication device or a gateway in multiple hops.

With further reference to FIG. 5, method 500 may include transmitting the battery information to an external device or another network in a communication protocol different from the wireless mesh network, at operation 508. For example, with reference to FIG. 2B, multiple communication devices 201s may communicate in a wireless mesh network, and communication device 201-N may be configured as a gateway and transmit the battery information to a user device 204 via another communication protocol, e.g., Bluetooth or other suitable short-range communication protocols. In other examples, device 201-N may also transmit the battery information to another network, such as CAN of a vehicle, or the Internet as previously described. It is appreciated that the battery information transmitted from the communication device (e.g., 201-N) to the user device 204 may be regarding the battery system to which the device (e.g., 201-N) is coupled. For example, the battery information may be received at communication device 201-N via an UART interface. Alternatively, the battery information transmitted from the device (e.g., 201-N) to the user device 204 may be regarding other battery system(s) received from other device(s) on the wireless mesh network 200.

As previously described, information transmitted on the wireless mesh network may be bi-directional. Accordingly, method 500 may also include transmitting information and/or control signals to a respective battery system, at operation 510. For example, a communication device associated with a respective battery system can also transmit information and/or a control signal to the respective battery system based in part on received battery information and/or commands from any other device(s) on the wireless mesh network, or from a user device or another network via a gateway.

Figure 7:
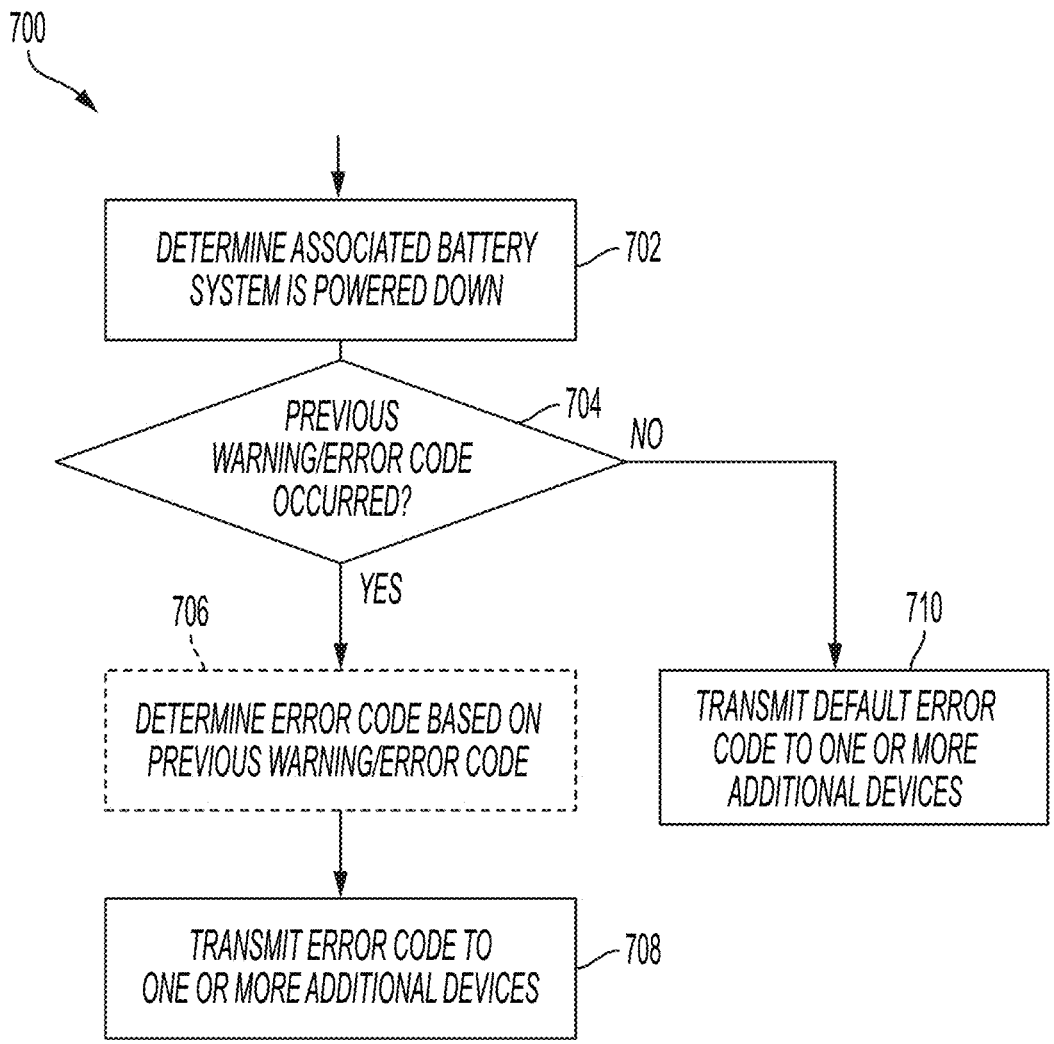
FIG. 7 is a flow diagram of an exemplary method for transmitting codes upon battery system failure as may be implemented in a communication device as shown in FIGS. 2A-2B and/or FIG. 3, according to some embodiments.

FIG. 7 is a flow diagram of an exemplary method 700 for transmitting error and/or warning codes regarding a battery system as may be implemented in a communication device as shown in FIGS. 2A-2B, according to some embodiments. Method 700 implements a context-based method for providing battery information in case of a battery system failure. In some embodiments, method 700 may be implemented in communication devices as shown in FIGS. 2A-2B (e.g., 201s), and FIG. 3 (e.g., 300). Method 700 may include determining that an associated battery system is powered down, at operation 702. For example, with reference to FIG. 3, when communication device 300 lost communication with the battery system 350, the communication device 300 may determine that the associated battery system 350 is powered down. In some embodiments, communication device 300 may determine the reason of the battery system failure and transmit such information to the wireless mesh network. For example, method 700 may further include determining whether a previous warning/error code occurred at the battery system, at operation 704. For example, method 700 may check whether a previous warning/error code has been stored in the memory of the communication device (e.g., using the process as described in FIG. 6). If it is determined that a previous warning/error code is stored, operation 704 may determine that a previous warning/error code has occurred at the battery system.

With further reference to FIG. 7, responsive to a determination that a previous warning/error code has occurred at the battery system, method 700 may further include transmitting the previous warning/error code to one or more additional communication devices (e.g., communication devices 201s in FIGS. 2A and 2B) on the wireless mesh network at operation 708. Additionally, and/or alternatively, method 700 may determine an error code for the battery system at operation 706 and transmit the error code at operation 708. At operation 706, the method may predict what might have occurred to the battery system based on the most recent warning/error code of the battery system. For example, responsive to determining that a previous warning (e.g., temperature warning) had occurred at the battery system and had been received by the communication device during a current low power operating mode and/or during a prior predetermined time period (e.g., a time period between active transmission modes), the method may predict that the battery system had failed due to the previously received warning code (e.g., due to the previously received temperature error or other warning code). Subsequently, the method transmits a temperature error code (or other previous warning code) to one or more other devices on the wireless mesh network. The time period associated with an warning/error code may be determined based on a time stamp associated with the warning/error code stored in the device. For example, with reference to FIG. 6, when data points are recorded, a time stamp may also be recorded in association with each data point. In operation 706, a current time (e.g., system time) is compared with the time stamp associated with the previous warning/error code to determine the time period, which may be indicative of how recent the previous warning/error had occurred in the battery system.

With further reference to FIG. 7, responsive to determining that no previous warning/error code occurred at the battery system (e.g., no error code is found in the memory of the communication device), the method may include transmitting a default code indicating an error (e.g., short circuit, power down, etc.) to one or more other devices on the wireless mesh network. Accordingly, even when a battery system completely fails, the communication device coupled thereto can still operate and provide the most recent status of the battery system to the wireless mesh network, and therefore, to a user device or other networks (e.g., via a gateway as previously described).

In various embodiments described above and further described herein, a communication device (e.g., any of 201s in FIGS. 2A-2B, and/or 300 in FIG. 3) may operate in one of a plurality of power modes. For example, as previously described and further herein, each communication device coupled to a respective battery system may be powered by the respective battery system. Alternatively, and/or additionally, the communication device may have a backup battery (as previously described), which enables the communication device to continue communicating with other devices on the wireless mesh network when the battery system coupled to the device fails (e.g., power is down). Accordingly, the communication device may be configured to operate in at least a low power mode, a transmission power mode, and/or a combination thereof. The low power mode enables the device to work in a power saving mode. For example, in the low power mode, the communication device may only performing a subset of operations (e.g., only receiving wake-up signals from a battery system or receiving warning codes from other devices) while suspending other operations. The low power mode enables the communication device to lower battery system power consumption during nominal operation as well as to preserve the backup battery when the device is powered solely by the backup battery. In the transmission power mode, the device may be fully functional, and is configured to transmit battery information to other communication devices on the wireless mesh network (and/or the gateway or user device). As elaborated on below, in embodiments in which a lower power mode and transmission power mode are used, a communication device may be configured to selectively switch between these operating modes based on one or more predetermined conditions.

In some embodiments, various conditions or a combination thereof may trigger a communication device to operate in the low power mode or the transmission power mode, or switch between the two modes. In some embodiments, the communication device is configured to operate in the low power mode responsive to a determination that one or more conditions or a combination thereof are satisfied. The one or more conditions include: a power state of the battery system to which the communication device is coupled is unchanged for a period of time; there is no load applied to the battery system; or no communication is received from any of the other communication devices on the wireless mesh network for a period of time.

In some embodiments, the communication device is configured to operate in the transmission power mode responsive to a determination that one or more conditions or a combination thereof are satisfied. The one or more conditions include: a wake-up signal is received from the battery system to which the communication device is coupled; a determination that a fault has occurred at the battery system; a power state of the battery system changes; a period of time elapses after the communication device changing to operation in the lower power mode; a fault that has previously occurred at the battery system is resolved; or a communication is received from at least one of the other communication devices on the wireless mesh network.

In some variations, the power modes for a communication device may include additional power modes. For example, a communication device may be configured to operate at a low power mode, transmission power mode, and full transmission power mode. As described herein, in the low power mode, the communication device is only performing a subset of operations (e.g., only receiving wake-up signals from a battery system or receiving warning codes from other devices) while suspending other operations. In transmission power mode, the communication device may operate with more functions and participate in the wireless mesh network with base topology radio on for the wireless mesh network. For example, the communication device may receive battery information from a battery system, and/or communicate with other communication devices on the wireless mesh network. In full transmission power mode, the device may operate will all functions in the transmission power mode, and additionally have the additional radios on (e.g., additional communication interfaces activated) for communicating with external user device or another network, as described above. Of course, other operating modes may also be used.

The triggering of these different power modes described herein is further illustrated in the following examples. In these examples, the battery system and the communication device may be implemented in 350 and 300 in FIG. 3, respectively. In some scenarios, when no load is applied to the battery system, the communication device coupled to the battery system may be configured to operate to alternate between a lower power mode and a transmission or power mode. In some scenarios, when the battery system is charging, the communication device coupled thereto may be configured to operate in the transmission power mode. When a warning/error (e.g., an over voltage warning, rate of charge warning, or other warning) is detected at the battery system, a signal indicating a warning/error code may be transmitted from the battery system to the communication device coupled thereto. A wake-up signal may precede the warning/error signal and is transmitted from the battery system to the communication device, and such wake-up signal may cause the communication device to switch to full transmission power mode. In such mode, the communication device may transmit the battery information regarding the battery system to other communication devices on the wireless mesh network and/or an external user device or another network as described above (e.g., FIG. 2A-2B).

In a similar scenario, when the battery system is discharging, the communication device coupled thereto may be configured to operate in the transmission power mode. When a warning/error related to discharge (e.g., a rate of discharge warning, low voltage warning, or other warning) is detected at the battery system, a signal indicating a warning/code code may be transmitted from the battery system to the communication device coupled thereto, and such signal may cause the communication device to switch to full transmission power mode. In such mode, the communication device may transmit the battery information regarding the battery system to other communication devices on the wireless mesh network and/or an external user device or another network as described above (e.g., FIG. 2A-2B). In other scenarios, when a warning occurs at the battery system, e.g., a low temperature warning, a high temperature warning, or other warning the communication device coupled to the battery system may also operate in the full transmission power mode.

In some embodiments, a communication device may be initially operating in a low power mode (e.g., at the device start). If one or more conditions are met, e.g., a time limit has exceeded, a battery state change has occurred, or a wake-up signal is received, and/or other conditions described above, the communication device may be configured to wake up and switch to the transmission power mode. The communication device may stay in the transmission power mode when the battery system is discharging/charging. In some embodiments, if a threshold time has elapsed after the battery system stops discharging/charging, the communication device may be configured to switch back to the low power mode.

Figure 8:
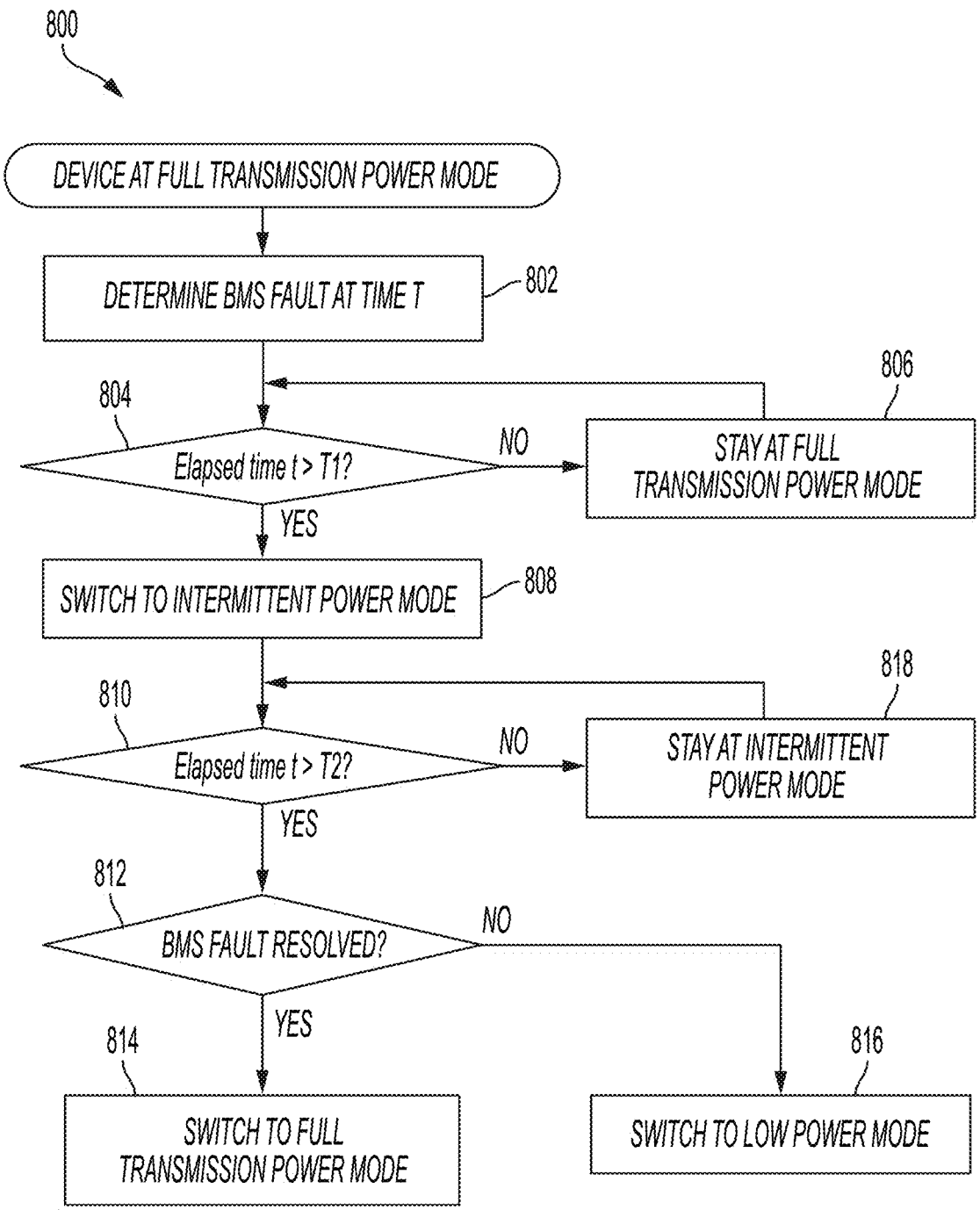
FIG. 8 is a flow diagram of an exemplary method for switching between different power modes as may be implemented in a communication device as shown in FIGS. 2A-2B and/or FIG. 3, according to some embodiments.

The scenarios described herein are merely examples of overall flow of process for switching between different power modes in a communication device and are not intended to limit the scope of the disclosure. In a non-limiting example of the above method, FIG. 8 is a flow diagram of another exemplary method 800 for switching between different power modes as may be implemented in a communication device as shown in FIGS. 2A-2B and/or FIG. 3, according to some embodiments. In further describing method 800, the battery system and communication device as refereed in various operations may be implemented in 350 and 300 in FIG. 3, respectively. Method 800 describes an example scenario in which the communication device is operating in full transmission power mode. At time T, method 800 may determine that the battery system is at fault at operation 802. For example, method 800 may determine that the battery system is at fault when the communication between the communication device and the battery system is disconnected. In such scenario, the battery system fault may be due to the battery system powered down, and/or other critical errors. In another scenario, the communication device may receive a battery error code from the battery system and determine the battery system fault based on the received error code.

Method 800 may further determine whether the time elapsed since the battery fault (or receiving the battery error signal) has exceeded a threshold time period T1, at operation 804. The time elapsed may be the difference between the current time (e.g., system time) and time T when the battery fault determined or when the battery fault information is received. In response to determining that the time elapsed since time T has not exceeded a threshold time period T1, method 800 will cause the device to stay at the same power mode, e.g., full transmission power mode, at operation 806. Conversely, in response to determining that the time elapsed has exceeded the threshold time period T1, method 800 may cause the device to switch to intermittent power mode at operation 808. In non-limiting examples, the threshold time period T1 may be 10 min, 20 min, 30 min, or any other suitable time period. In some embodiments, when the battery fault is determined, the communication device may already be switched to backup battery (in case the battery system is powered down). In such case, the threshold time may be determined based on the capacity of the backup battery, and/or other conditions.

With further reference to FIG. 8, method 800 continue checking whether the time elapsed since time T has exceeded a second threshold time period T2, at operation 810. In some examples, the threshold time period T2 may be a time period greater than T1, e.g., 45 min, 60 min, or any other suitable time period. Similar to T1, threshold time period may also be based on the capacity of the backup battery and/or other conditions. In response to determining that the time elapsed has not exceeded a threshold time period T2, method 800 will cause the device to stay at the same power mode, e.g., intermittent power mode, at operation 818. Conversely, in response to determining that the time elapsed has exceeded the threshold time period T2, method 800 may check whether the battery fault has been resolved at operation 812. In some embodiments, method 800 may determine that the battery fault has been resolved when the communication between the communication device and the battery system has been restored, or when a normal battery code is received at the communication device from the battery system. Otherwise, method 800 may determine that the battery fault has not been resolved. It is appreciated that other methods for determining whether the battery fault has been resolved may also be possible.

In response to determining that the battery fault has been resolved, method 800 may proceed switching to full transmission power mode, at operation 814. In a non-limiting example, the battery fault has been resolved when the communication between the communication device and the battery system has been restored. In such case, the communication device may be powered by the battery system again, and thus, has full power to operate at the full transmission power mode. Conversely, in response to determining that the battery fault has not been resolved, method 800 may proceed switching to low power mode, at operation 816. In a non-limiting example, when the battery fault has not been resolved, it is likely that the battery system is still powered down and the communication device is powered by the backup battery. By this time, the communication device is switched to low power mode to preserve battery.

Various embodiments described herein with reference to FIGS. 2A-8 may enable various applications in which a plurality of battery systems may be reliably monitored via a wireless mesh network. In an example configuration, each of the plurality of battery systems may be coupled to a respective communication device, e.g., a dongle which connects to the battery system via a UART interface. The communication device may include a wireless communication interface to communicate with other communication devices on a wireless mesh network. In such configuration, multiple battery systems may communicate with each other on the wireless mesh network. In a non-limiting application, a dedicated gateway may also communicate with the wireless mesh network, and additionally connect to a CAN of a vehicle via a CAN BUS. The gateway may additionally be configured to communicate with an external user device (e.g., a smartphone) via another communication protocol, e.g., Bluetooth.

In some scenarios, a battery system in the above described configuration may experience an overcharge (e.g., the charging volt is greater than 14 volts on a 12-volt system) and send a wake-up signal to the communication device that is coupled to the battery system, for example, via an UART interface as described in various embodiments above. At this time, the communication device may be in a low power mode. In response to receiving the wake-up signal, the communication device may switch to transmission power mode, under which the communication device may subsequently receive a battery warning/error code (e.g., overcharge warning) from the battery system. Further, the communication device may transmit the received warning/error code to one or more other communication devices on the wireless mesh network, where the warning/error code may reach the gateway via one or more hops.

At the gateway, the battery warning/error code may be transmitted to the CAN of the vehicle through the CAN BUS. Optionally, the warning/error code may be converted at the gateway before being transmitted to the CAN. Additionally, and/or alternatively, the gateway may transmit the battery warning/error code to the user device, for example, via Bluetooth. At the CAN system of the vehicle, in response to receiving the battery warning/error code (e.g., overcharge warning), the CAN system may change the charging mode in the vehicle.

The above scenarios are only exemplary. It is appreciated that various battery applications for various types of vehicles such as a car, a recreational vehicle (RV) or a boat, or other devices, e.g., consumer electronics, industrial machinery etc. may also utilize the techniques described herein.

The above-described embodiments of the present invention can be implemented in any of numerous ways. For example, the embodiments may be implemented in a communication device or gateway as described herein (e.g., 201 in FIGS. 2A-2B) using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Further, it should be appreciated that the communication device or gateway as described herein may be embodied in a computing device in any of a number of forms, such as a rack-mounted computer, a desktop computer, a laptop computer, or a tablet computer or other suitable computing device.

Depending on the nature of the communication device or gateway, one or more additional elements may be present. For example, a computing device may include sensors such as a global positioning system (GPS) to sense location and inertial sensors such as a compass, an inclinometer and/o ran accelerometer. The operating system may include utilities to control these devices to capture data from them and make it available to applications executing on the computing device.

As another example, in some embodiments, a computing device may include a network interface to implement a personal area network. Such an interface may operate in accordance with any suitable technology, including a Bluetooth, Zigbee or an 802.11 ad hoc mode, for example.

Such a computer device may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, a computing device, e.g., a gateway and/or a user device, may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a gateway and/or a user device may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. Alternatively, the input/output devices may be entirely disconnected from the computing device, and functionally integrated through a wireless connection.

The computing device may be a computer system including an operating system that manages at least a portion of the hardware elements. In some examples, a processor or controller executes an operating system. Examples of a particular operating system that may be executed include a Windows-based operating system, such as, Windows 10, Windows 8, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, such as embedded operation systems, and examples are not limited to any particular operating system.

The processor and operating system together define a computer platform for which application (or embedded application) programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In this respect, the various techniques described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

The terms "code", "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. The instructions may be persistently stored as encoded signals, and the instructions may cause the processor to perform any of the functions described herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements. The media may, for example, be optical disk, magnetic disk or flash memory, among others. In operation, the processor manipulates the data within the memory, and then copies the data to the storage medium associated with the data storage element after processing is completed. A variety of components may manage data movement between the storage medium and other memory elements and examples are not limited to particular data management components. Further, examples are not limited to a particular memory system or data storage system.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A device for monitoring information regarding a plurality of battery systems, the device comprising:
at least one processor configured to be in electronic communication with a first battery system to obtain battery information regarding the first battery system; and
a wireless communication interface coupled to the at least one processor and configured to communicate with a plurality of additional devices in a wireless mesh network, wherein each of the plurality of additional devices is coupled to a respective one of a plurality of second battery systems and configured to obtain battery information regarding the respective second battery system;
wherein the at least one processor is further configured to, via the wireless mesh network:
transmit the battery information regarding the first battery system to one or more of the plurality of additional devices; and
receive, from at least one of the plurality of additional devices, the battery information regarding the respective second battery system to which the at least one of the plurality of additional devices is coupled;
wherein the at least one processor is further configured to, responsive to determining that the first battery system is powered down, determine a warning/error code for the first battery system and transmit the warning/error code to one or more of the plurality of additional devices.

2. The device of claim 1, wherein:
the wireless mesh network is configured to operate in a first communication protocol;
the wireless communication interface is a first communication interface; and
the device further comprises a second communication interface coupled to the at least one processor and configured to transmit at least the battery information regarding the respective second battery system to an external device or another network in a second communication protocol different from the first communication protocol.

3. The device of claim 2, wherein the external device is a portable electronic device.

4. The device of claim 2, wherein the another network is a controller area network (CAN) onboard a vehicle in which the first battery system is installed.

5. The device of claim 2, wherein the another network is the Internet.

6. The device of claim 1, further comprising a backup battery, wherein the device is configured to be powered by the first battery system or the backup battery, and wherein the device is configured to operate in at least a low power mode or a transmission power mode.

7. The device of claim 6, wherein the at least one processor is further configured to cause the device to operate in the low power mode responsive to a determination that one or more conditions or a combination thereof are satisfied, the one or more conditions comprising:
a power state of the first battery system is unchanged for a first period of time;
there is no load applied to the first battery system; or
no communication is received from any of the plurality of additional devices for a second period of time.

8. The device of claim 6, wherein the at least one processor is configured to cause the device to operate in the transmission power mode responsive to a determination that one or more conditions or a combination thereof are satisfied, the one or more conditions comprising:
a wake-up signal is received from the first battery system;
a determination that a fault has occurred at the first battery system;
a power state of the first battery system changes;
a third period of time elapses after changing to operation in the low power mode;
a fault that has previously occurred at the first battery system is resolved; or
a communication is received from at least one of the plurality of additional devices.

9. The device of claim 8, wherein the at least one processor is configured to:
receive a wake-up signal from the first battery system; and
subsequent to receiving the wake-up signal, receiving the battery information regarding the first battery system from the first battery system.

10. The device of claim 1, wherein the at least one processor is further configured to:

transmit information and/or a control signal to the first battery system based in part on received battery information and/or commands from the at least one of the plurality of additional devices.

11. A device for monitoring information regarding a plurality of battery systems, the device comprising:
at least one processor configured to be in electronic communication with a first battery system to obtain battery information regarding the first battery system; and
a wireless communication interface coupled to the at least one processor and configured to communicate with a plurality of additional devices in a wireless mesh network, wherein each of the plurality of additional devices is coupled to a respective one of a plurality of second battery systems and configured to obtain battery information regarding the respective second battery system;
wherein the at least one processor is further configured to, via the wireless mesh network:
transmit the battery information regarding the first battery system to one or more of the plurality of additional devices; and
receive, from at least one of the plurality of additional devices, the battery information regarding the respective second battery system to which the at least one of the plurality of additional devices is coupled;
wherein the at least one processor is configured to:
determine that the first battery system is powered down;
responsive to determining that the first battery system is powered down, determine whether a previous warning/error code occurred at the first battery system;
responsive to determining that a previous warning/error code occurred at the first battery system, transmit the previous warning/error code to one or more of the plurality of additional devices; and
responsive to determining that no previous warning/error code occurred at the first battery system, transmit a default code indicating an error to one or more of the plurality of additional devices.

12. A method for monitoring information regarding a plurality of battery systems, the method comprising, by a device in electronic communication with a first battery system:
obtaining battery information regarding the first battery system;
transmitting, using a first communication interface of the device, the battery information regarding the first battery system to one or more of a plurality of additional devices in a wireless mesh network, wherein each of the plurality of additional devices is coupled to a respective one of a plurality of second battery systems via the wireless mesh network and configured to obtain battery information regarding the respective second battery system;
receiving, in the wireless mesh network, from at least one of the plurality of additional devices, the battery information regarding the respective second battery system to which the at least one of the plurality of additional devices is coupled;
responsive to determining that the first battery system is powered down, determining a warning/error code for the first battery system and transmitting the warning/error code to one or more of the plurality of additional devices.

13. The method of claim 12, further comprising:
using a second communication interface of the device to transmit at least the battery information regarding the respective second battery system to an external device or another network;
wherein the first communication interface and the second communication interface of the device are operative in different communication protocols.

14. The method of claim 13, wherein the external device is a portable electronic device.

15. The method of claim 13, wherein the another network is a controller area network (CAN) onboard a vehicle in which the first battery system is installed.

16. The method of claim 13, wherein the another network is the Internet.

17. The method of claim 12, further comprising:
powering the device by the first battery system or a backup battery; and
operating the device in at least a low power mode or a transmission power mode.

18. The method of claim 17, further comprising:
operating the device in the low power mode responsive to a determination that one or more conditions or a combination thereof are satisfied, the one or more conditions comprising:
a power state of the first battery system is unchanged for a first period of time;
there is no load applied to the first battery system; or
no communication is received from any of the plurality of additional devices for a second period of time.

19. The method of claim 17, further comprising:
operating the device in the transmission power mode responsive to a determination that one or more conditions or a combination thereof are satisfied, the one or more conditions comprising:
a wake-up signal is received from the first battery system;
a determination that a fault has occurred at the first battery system;
a power state of the first battery system changes;
a third period of time elapses after changing to operation in the low power mode;
a fault that has previously occurred at the first battery system is resolved; or
a communication is received from at least one of the plurality of additional devices.

20. The method of claim 19, further comprising:
receiving a wake-up signal from the first battery system; and
responsive to receiving the wake-up signal from the first battery system, receiving the battery information regarding the first battery system from the first battery system.

21. The method of claim 12, wherein responsive to determining that the first battery system is powered down, determining a warning/error code for the first battery system and transmitting the warning/error code to one or more of the plurality of additional devices comprises:
determining that the first battery system is powered down;
responsive to determining that the first battery system is powered down, determining whether a previous warning/error code occurred at the first battery system;
responsive to determining that a previous warning/error code occurred at the first battery system, transmit the previous warning/error code to one or more of the plurality of additional devices; and responsive to determining that no previous warning/error code occurred at the first battery system, transmit a default code indicating an error to one or more of the plurality of additional devices.

22. The method of claim 12, further comprising:
transmitting information and/or a control signal to the first battery system based in part on received battery information and/or commands from the at least one of the plurality of additional devices.

23. A non-transitory computer readable medium including processor executable instructions that when executed by one or more processors performs the method of claim 12.

* * * * *